E. NICHOLSON.
Cutting Block for Leather Work.

No. 201,622.          Patented March 26, 1878.

WITNESSES          INVENTOR

Frank G. Parker          Ezekiel Nicholson
John James          By his Attorney
         J. L. Newton

N. PETERS, PHOTO-LITHOGRAPHER, WASHINGTON, D. C.

UNITED STATES PATENT OFFICE.

EZEKIEL NICHOLSON, OF LYNN, MASSACHUSETTS.

IMPROVEMENT IN CUTTING-BLOCKS FOR LEATHER-WORK.

Specification forming part of Letters Patent No. 201,622, dated March 26, 1878; application filed October 5, 1877.

*To all whom it may concern:*

Be it known that I, EZEKIEL NICHOLSON, of Lynn, in the county of Essex and State of Massachusetts, have invented an Improved Cutting-Block for Leather-Work, of which the following is a specification:

The invention is a cutting-block used in cutting leather in the manufacture of shoes and boots, or any kind of leather-work.

Figure 1:
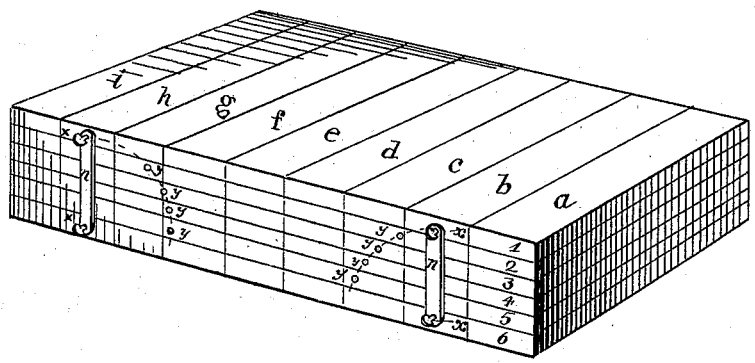
Figure 2:
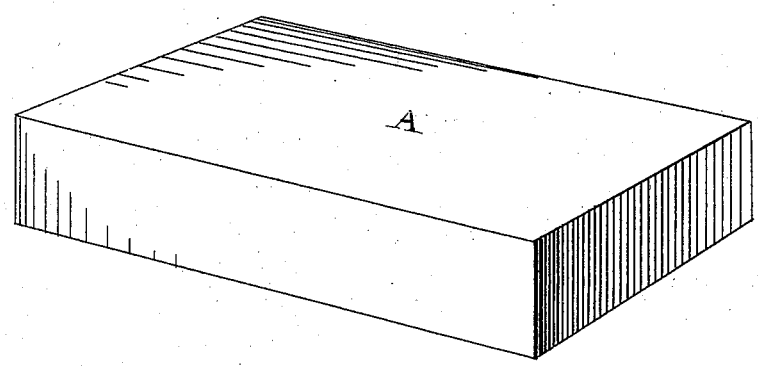

In the accompanying drawings I have shown two figures, in which Figure 1 shows the improved cutting-block, and Fig. 2 the block as now used.

The block as now used is a section of soft wood, cut across the grain of the wood, and is about forty inches in length and twenty inches in breadth, and six inches in thickness. When the surface has become worn by use it becomes necessary to even the surfaces, and generally the work is so difficult that the block must be sent to the factory for resawing and smoothing, unless the cutter has tools to even the same, or the block is thrown aside and a new one obtained, and thus much cost and waste incurred.

My improved block has much advantage over the block as now used.

Fig. 1 represents a block of the same size as Fig. 2. The pieces *a b c*, &c., in Fig. 1, are sections of wood, cut across the grain of the wood and glued together, and there are six sections, 1 2 3 4 5 6, making six boards, and these boards are about an inch in thickness. When the surface of the first or outer board is worn it can be turned over, and the surface of the same board used, and the board 1 may be thrown aside as used up, and the next board used. To fasten these boards together, it will be observed that I have used the ties *n n* on one side of the block, (and the same on the opposite side,) fastened by screws *x x*, &c., and have made holes *y y*, &c., in each of the boards, answering the purpose of not only fastening the series of boards together, but also the series of boards may be lessened in number if the whole six boards make the bench or table too high for the workman.

It will be observed, also, that when the ties *n n* are moved toward each other, an arc of a circle is described by each tie, so that when the upper screws *x x* are withdrawn from the upper board and the said ties are moved—on the screws in the lower board as pivots—toward each other to the next lower board in the series, the screws are driven in at the holes *y y*, the same being in the periphery of the arc of the circle described by each tie; and, moreover, the said ties being moved toward each other, (and if moved in a direction opposite each other the same result would follow,) all shucking of the series of boards will be thereby prevented.

I have shown a cutting-board made in six sections. I am not confined to numbers of sections above two sections, nor to the exact thickness of each section, as herein described; but

What I claim is—

1. An improved cutting-block for leather-work made up of a series or layers of boards, and secured together by a fastening device, so that the upper or worn surface may be turned under, or the upper layer removed for the exposure of a new surface, all as shown and described.

2. A cutting-block for leather-work composed of a series or layers of boards, each board made up from transverse sections of wood cut across the grain, all secured together by a suitable adjustable fastening, as shown and described.

3. In a leather-cutting block, the fastening device *n n*, adapted to secure together a series of boards, as shown and described, and by its being moved in the arc of a circle to allow the thickness of the block to be increased or diminished for the purpose of removing a worn surface, all as set forth.

EZEKIEL NICHOLSON.

Witnesses:
J. L. NEWTON,
JOHN GRAY.